(No Model.)
A. DOLL.
EGG AND FLOUR MIXER.
No. 266,679. Patented Oct. 31, 1882.
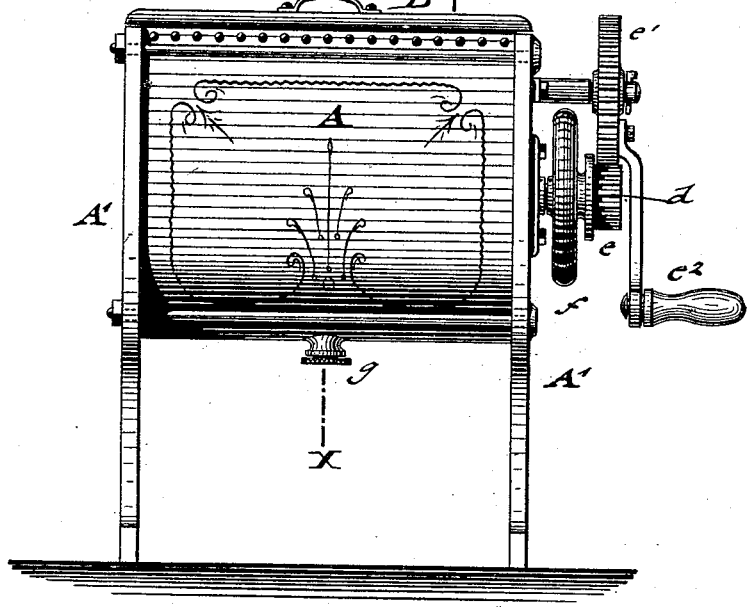
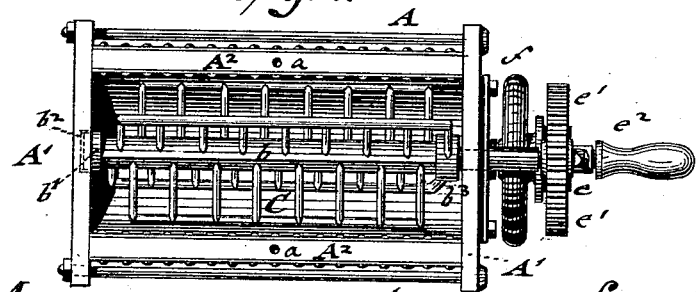
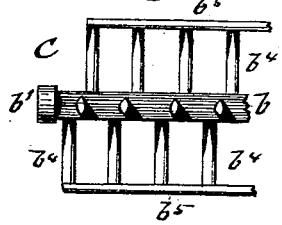
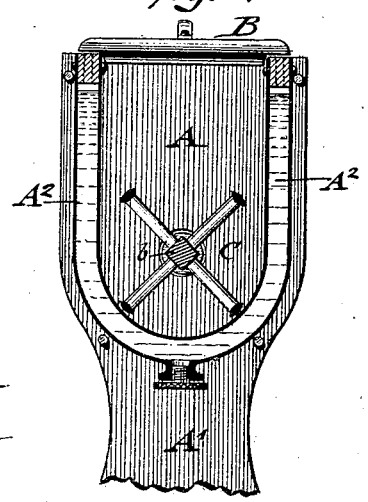
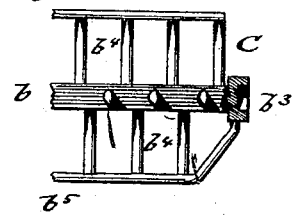
WITNESSES:
J. W. Rosenbaum
Otto Risch
INVENTOR
Arnold Doll
BY Paul Goepel
ATTORNEY

UNITED STATES PATENT OFFICE.

ARNOLD DOLL, OF CLEVELAND, OHIO.

EGG AND FLOUR MIXER.

SPECIFICATION forming part of Letters Patent No. 266,679, dated October 31, 1882.

Application filed September 22, 1882. (No model.)

*To all whom it may concern:*

Be it known that I, ARNOLD DOLL, of Cleveland, in the county of Cuyahoga and State of Ohio, have invented certain new and useful Improvements in Egg and Flour Mixers, of which the following is a specification.

This invention relates to a mixing-machine for the use of bakers and confectioners, whereby eggs, sugar, and flour may be quickly and thoroughly mixed for sponge and other light cakes; and the invention consists of a baker's egg and flour mixer in which a beater of certain improved construction is revolved in a jacketed receptacle or trough, as will appear more fully hereinafter.

In the accompanying drawings, Figure 1 represents a side elevation of my improved egg and flour mixer. Fig. 2 is a plan with cover removed; Fig. 3, a vertical transverse section of the same on line $x\ x$, Fig. 1. Figs. 4 and 5 represent detail side views of the beater used in my machine.

Similar letters of reference indicate corresponding parts.

Referring to the drawings, A represents an oblong receptacle or mixing-trough, which is supported on side standards, A', preferably of cast-iron. The receptacle or trough A is preferably lined with galvanized zinc and arranged with a jacket, $A^2$, formed by the double side walls and double rounded bottom. The jacket $A^2$ is filled through top openings, $a$, either with hot or cold water, according to the ingredients to be mixed, or with steam when large quantities of light dough have to be mixed. During the mixing operation the trough A is closed by a tightly-fitting cover, B.

At the interior of the trough A is arranged an agitator or beater, C, the longitudinal center shaft, $b$, of which is supported by a collar, $b'$, at one end in a bearing, $b^2$, of one of the side standards A', while the opposite end is coupled by a square socket, $b^3$, with a short detachable transmitting-shaft, $d$, which shaft is passed through a journaled opening of the opposite side standard A'. The beater C is preferably made of cast-iron, with four or more rows of flat radial arms, $b^4$, the arms being set transversely to the direction of motion, so as to cut with their edges through the material to be mixed. The arms $b^4$ of the different rows are so arranged on the shaft that the arms of one row are arranged intermediately between the arms of the adjoining rows, so that each arm cuts a separate and independent path through the material to be mixed. The beater-arms $b^4$ are connected at their outer ends by longitudinal stiffening-rods $b^5$, which impart rigidity to the entire row of arms. One of the rows of beater-arms is beveled or rounded off at the socket end of the shaft $b$ for the purpose of admitting the insertion of that end of the beater-shaft having the collar $b'$ into the bearing $b^2$ of the side standard, A', which could not be done but for this rounding or beveling off.

The beater C receives rotary motion for mixing eggs, sugar, flour, or other materials placed in the trough by any suitable gearing applied to the short detachable shaft $d$ or by belt and pulley, according as the mixer is to be worked by hand or power. For machines worked by hand a fly-wheel, $f$, is placed on the shaft $d$, which wheel carries also a pinion, $e$, at its outer end, said pinion meshing with a gear-wheel, $e'$, having a hand-crank, $e^2$. By detaching the shaft $d$ and fly-wheel $f$ the beater may be removed from its bearings in the side walls of the trough A for cleaning, and also the mixed dough removed from the trough without difficulty. A screw or other plug, $g$, closes an opening at the bottom of the jacket $A^2$ for letting out the hot or cold water, while a second plug closes the opening in the side standard, A', when the shaft $d$ is removed.

In revolving the beater the radial arms of the same agitate the materials placed in the trough, while the longitudinal stiffening-rods move closely along the inner walls of the trough, so as to take up the materials deposited thereon and return them into the path of the radial beater-arms, whereby the thorough mixing of the eggs, sugar, flour, or other materials is secured in a very short time, and a dough of the required consistency and lightness obtained.

Having thus described my invention, I claim as new and desire to secure by Letters Patent—

1. In a baker's egg and flour mixer, the combination of a jacketed mixing-trough, a detachable beater having rows of radial arms connected by longitudinal stiffening-rods at their outer ends, and means for revolving the beater, substantially as set forth.

2. In a baker's egg and flour mixer, the combination of the jacketed mixing-trough A A' A², having a shaft-bearing in one side standard and a journaled opening in the opposite side standard, with a detachable beater, C, composed of a center shaft, $b$, having a collar, $b'$, at one end, a socket, $b^3$, at the other end, and rows of radial arms $b^4$, connected by longitudinal stiffening-rods $b^5$ at the outer ends, and a detachable driving-shaft, $d$, for revolving the beater, said shaft being passed through the journaled opening of the side standard, A', and coupled to the socket end of the beater-shaft, substantially as specified.

3. In a baker's egg and flour mixer, a beater composed of a center shaft having rows of radial stirrer-arms, connected by longitudinal stiffening-rods at the ends, the arms of one row being arranged to alternate with the arms of the adjoining rows, substantially as specified.

In testimony that I claim the foregoing as my invention I have signed my name in presence of two subscribing witnesses.

ARNOLD DOLL.

Witnesses:
PAUL GOEPEL,
SIDNEY MANN.